United States Patent
Martin et al.

(10) Patent No.: US 12,291,349 B2
(45) Date of Patent: May 6, 2025

(54) DIHYDROGEN SUPPLY SYSTEM FOR AN AIRCRAFT ENGINE

(71) Applicant: Airbus Operations SAS, Toulouse (FR)

(72) Inventors: Pierre-Olivier Martin, Toulouse (FR); Lionel Czapla, Toulouse (FR); Mathieu Belleville, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/356,655

(22) Filed: Jul. 21, 2023

(65) Prior Publication Data

US 2024/0150033 A1    May 9, 2024

(30) Foreign Application Priority Data

Jul. 25, 2022  (FR) ..................... 2207595

(51) Int. Cl.
  *B64D 37/30*   (2006.01)
  *B64D 37/00*   (2006.01)
  *F02C 7/232*   (2006.01)

(52) U.S. Cl.
  CPC .......... *B64D 37/30* (2013.01); *B64D 37/005* (2013.01); *F02C 7/232* (2013.01)

(58) Field of Classification Search
  CPC ......... B64D 37/30; B64D 37/34; F02C 7/224; F02C 7/236; F02C 7/222; F02C 7/22
  See application file for complete search history.

(56) References Cited

U.S. PATENT DOCUMENTS

| 2013/0074945 A1* | 3/2013 | Karaca .................. F02C 9/40 137/154 |
| 2014/0174083 A1 | 6/2014 | Gerstler et al. |
| 2022/0163170 A1 | 5/2022 | Bensadoun et al. |
| 2022/0267021 A1 | 8/2022 | Zebian et al. |
| 2022/0307428 A1* | 9/2022 | Sibbach .................. F02C 3/22 |
| 2023/0339621 A1* | 10/2023 | Sarkar .................... B64D 37/34 |

FOREIGN PATENT DOCUMENTS

| EP | 4049934 A1 | 8/2022 |
| FR | 3114355 A1 | 3/2022 |
| WO | 2020188194 A1 | 9/2020 |
| WO | 2022106053 A1 | 5/2022 |
| WO | 2022234176 A1 | 11/2022 |

OTHER PUBLICATIONS

French Search Report for corresponding French Patent Application No. 2207595 dated Feb. 15, 2023; priority document.

* cited by examiner

*Primary Examiner* — Alain Chau
*Assistant Examiner* — Roberto Toshiharu Igue
(74) *Attorney, Agent, or Firm* — Greer, Burns & Crain, Ltd.

(57) ABSTRACT

A supply system for an aircraft, wherein the supply system has a supply module with outlet pipes, feed pipes connected to dihydrogen tanks, and means for channeling the dihydrogen in the feed pipes towards the outlet pipes, a distribution module having introduction pipes connected to the outlet pipes via heaters, distribution pipes connected to an engine, and means for channeling the dihydrogen in the introduction pipes towards the distribution pipes, and a control unit which commands the means of the supply module and of the distribution module depending on the information provided by the detection means. Also an aircraft with such a supply system.

3 Claims, 5 Drawing Sheets

DIHYDROGEN SUPPLY SYSTEM FOR AN AIRCRAFT ENGINE

CROSS-REFERENCES TO RELATED APPLICATIONS

This application claims the benefit of French Patent Application Number 2207595 filed on Jul. 25, 2022, the entire disclosure of which is incorporated herein by way of reference.

FIELD OF THE INVENTION

The present invention relates to a dihydrogen supply assembly for an aircraft engine, and to an aircraft having such a supply assembly.

BACKGROUND OF THE INVENTION

In order to reduce emissions of carbon dioxide ($CO_2$) from aircraft engines, it is known to use dihydrogen as fuel. The aircraft then has a main supply system which has liquid hydrogen tanks. In order to be utilized by the engines, the dihydrogen must be in gaseous form and, to this end, the main supply system has heaters which heat the dihydrogen. To bring the dihydrogen from the tank to the engine, the main supply system has a network of pipes, pumps and valves which goes from the tanks to the engines via the heaters.

The supply of dihydrogen must be ensured even if an incident occurs on one of the elements of the main supply system. To this end, it is known to install a redundant supply system which takes over in the event of a problem on the main supply system.

Although such an arrangement performs well from an operating perspective, it generates additional weight and complexity owing to the duplication of the supply system.

It is therefore necessary to find a different arrangement which makes it possible to supply dihydrogen to the engines even in the event of an incident whilst still keeping the weight down for the aircraft.

SUMMARY OF THE INVENTION

An object of the present invention is to propose a supply system for an engine of an aircraft, wherein the said supply system makes it possible to supply dihydrogen to the engine from a tank even in the event of an incident on one of the elements of the said supply system.

To that end, what is proposed is a supply system for an aircraft, having a first and a second dihydrogen tank and an engine, the said supply system having:
  a supply module having a first outlet pipe, a second outlet pipe, a first feed pipe fitted with a first main pump and intended to be fluidically connected to the first tank, a second supply pipe fitted with a second main pump and intended to be fluidically connected to the second tank, and means designed to channel the dihydrogen in the first and second feed pipes alternatively towards the first outlet pipe or the second outlet pipe or both,
  a first heater,
  a second heater,
  a distribution module having a first introduction pipe fluidically connected to the first outlet pipe via the first heater, a second introduction pipe fluidically connected to the second outlet pipe via the second heater, a first distribution pipe and a second distribution pipe that are intended to be fluidically connected to the engine, and means for channeling the dihydrogen in the first and second introduction pipes alternatively towards the first distribution pipe or the second distribution pipe or both,
  detection means intended to detect an incident in the supply module and/or the distribution module and/or the first and second heaters, and to provide information representative of the said incident that was detected, and
  a control unit designed to command the means of the supply module and/or the means of the distribution module depending on the information provided by the detection means.

Such a supply system supplies dihydrogen to the engine from a tank even in the event of an incident on one of the elements of the said supply system.

According to a particular embodiment, the supply module has:
  an upstream pipe fluidically connected between the first and second feed pipes,
  a downstream pipe fluidically connected between the first outlet pipe and the second outlet pipe,
  a first linking pipe and a second linking pipe that are fluidically connected in parallel between the upstream pipe and the downstream pipe,
  a first sub-pipe and a second sub-pipe that are fluidically connected in parallel between the first linking pipe and the second linking pipe,
  a two-way first solenoid valve mounted on the first linking pipe between the upstream pipe and the first sub-pipe,
  a first secondary pump mounted on the first linking pipe between the first solenoid valve and the first sub-pipe,
  a two-way second solenoid valve mounted on the first linking pipe between the first sub-pipe and the second sub-pipe,
  a regulating two-way third solenoid valve mounted on the first linking pipe between the second sub-pipe and the downstream pipe,
  a two-way fourth solenoid valve mounted on the first linking pipe between the third solenoid valve and the downstream pipe,
  a two-way fifth solenoid valve mounted on the second linking pipe between the upstream pipe and the first sub-pipe,
  a regulating two-way sixth solenoid valve mounted on the second linking pipe between the fifth solenoid valve and the first sub-pipe,
  a two-way seventh solenoid valve mounted on the second linking pipe between the first sub-pipe and the second sub-pipe,
  a second secondary pump mounted on the second linking pipe between the second sub-pipe and the downstream pipe,
  a two-way eighth solenoid valve mounted on the second linking pipe between the second secondary pump and the downstream pipe,
  a two-way ninth solenoid valve mounted on the first sub-pipe, and
  a two-way tenth solenoid valve mounted on the second sub-pipe.

According to a particular embodiment, the supply module has:
  an upstream pipe fluidically connected between the first and second feed pipes,
  a downstream pipe fluidically connected between the first outlet pipe and the second outlet pipe, a first linking pipe and a second linking pipe that are fluidically connected in parallel between the upstream pipe and the downstream pipe,
a first sub-pipe and a second sub-pipe that are fluidically connected in parallel between the first linking pipe and the second linking pipe,
a two-way first solenoid valve mounted on the first linking pipe between the upstream pipe and the first sub-pipe,
a first secondary pump mounted on the first linking pipe between the first solenoid valve and the first sub-pipe,
a two-way second solenoid valve mounted on the first linking pipe between the first sub-pipe and the second sub-pipe,
a second secondary pump mounted on the first linking pipe between the second sub-pipe and the fourth solenoid valve,
a two-way fourth solenoid valve mounted on the first linking pipe between the third solenoid valve and the downstream pipe,
a two-way fifth solenoid valve mounted on the second linking pipe between the upstream pipe and the first sub-pipe,
a regulating two-way sixth solenoid valve mounted on the second linking pipe between the fifth solenoid valve and the first sub-pipe,
a two-way seventh solenoid valve mounted on the second linking pipe between the first sub-pipe and the second sub-pipe,
a third solenoid valve mounted on the second linking pipe between the second sub-pipe and the downstream pipe,
a two-way eighth solenoid valve mounted on the second linking pipe between the second secondary pump and the downstream pipe,
a two-way ninth solenoid valve mounted on the first sub-pipe, and
a two-way tenth solenoid valve mounted on the second sub-pipe.

According to a particular embodiment, the supply module has:
an upstream pipe fluidically connected between the first and second feed pipes,
a downstream pipe fluidically connected between the first outlet pipe and the second outlet pipe,
a first linking pipe and a second linking pipe that are fluidically connected in parallel between the upstream pipe and the downstream pipe,
a first sub-pipe and a second sub-pipe that are fluidically connected in parallel between the first linking pipe and the second linking pipe,
at the connection between the upstream pipe and the first linking pipe, a three-way first solenoid valve,
at the connection between the first linking pipe and the first sub-pipe, a three-way second solenoid valve,
at the connection between the first linking pipe and the second sub-pipe, a three-way third solenoid valve,
at the connection between the downstream pipe and the first linking pipe, a three-way fourth solenoid valve,
between the first solenoid valve and the second solenoid valve, a first secondary pump,
between the third solenoid valve and the fourth solenoid valve, a regulating two-way fifth solenoid valve,
at the connection between the upstream pipe and the second linking pipe, a three-way sixth solenoid valve,
at the connection between the second linking pipe and the first sub-pipe, a three-way seventh solenoid valve,
at the connection between the second linking pipe and the second sub-pipe, a three-way eighth solenoid valve,
at the connection between the downstream pipe and the second linking pipe, a three-way ninth solenoid valve,
between the sixth solenoid valve and the seventh solenoid valve, a regulating two-way tenth solenoid valve, and
between the eighth solenoid valve and the ninth solenoid valve, a second secondary pump.

According to a particular embodiment, the supply module has:
an upstream pipe fluidically connected between the first and second feed pipes,
a downstream pipe fluidically connected between the first outlet pipe and the second outlet pipe,
a first linking pipe and a second linking pipe that are fluidically connected in parallel between the upstream pipe and the downstream pipe,
a first sub-pipe and a second sub-pipe that are fluidically connected in parallel between the first linking pipe and the second linking pipe,
at the connection between the upstream pipe and the first linking pipe, a three-way first solenoid valve,
at the connection between the first linking pipe and the first sub-pipe, a three-way second solenoid valve,
at the connection between the first linking pipe and the second sub-pipe, a three-way third solenoid valve,
at the connection between the downstream pipe and the first linking pipe, a three-way fourth solenoid valve,
between the first solenoid valve and the second solenoid valve, a first secondary pump,
between the third solenoid valve and the fourth solenoid valve, a second secondary pump,
at the connection between the upstream pipe and the second linking pipe, a three-way sixth solenoid valve,
at the connection between the second linking pipe and the first sub-pipe, a three-way seventh solenoid valve,
at the connection between the second linking pipe and the second sub-pipe, a three-way eighth solenoid valve,
at the connection between the downstream pipe and the second linking pipe, a three-way ninth solenoid valve,
between the sixth solenoid valve and the seventh solenoid valve, a regulating two-way tenth solenoid valve, and
between the eighth solenoid valve and the ninth solenoid valve, a regulating two-way fifth solenoid valve.

According to one variant, the first introduction pipe is fluidically connected to the first distribution pipe, the second introduction pipe is fluidically connected to the second distribution pipe, and the distribution module has:
a bypass pipe fluidically connected between the first introduction pipe and the second introduction pipe,
a two-way eleventh solenoid valve mounted on the bypass pipe,
between the first heater and the bypass pipe, a two-way twelfth solenoid valve mounted on the first introduction pipe,
between the bypass pipe and the engine, a thirteenth solenoid valve mounted on the first distribution pipe,
between the second heater and the bypass pipe, a two-way fourteenth solenoid valve mounted on the second introduction pipe, and
between the bypass pipe and the engine, a fifteenth solenoid valve mounted on the second distribution pipe.

According to one variant, the first introduction pipe is fluidically connected to the first distribution pipe, the second introduction pipe is fluidically connected to the second distribution pipe, and the distribution module has:
a bypass pipe fluidically connected between the first introduction pipe and the second introduction pipe, at the connection between the first introduction pipe and the bypass pipe, a three-way eleventh solenoid valve, wherein one port is fluidically connected to the first introduction pipe, one port is fluidically connected to the bypass pipe, and one port is fluidically connected to the first distribution pipe, at the connection between the second introduction pipe and the bypass pipe, a three-way twelfth solenoid valve, wherein one port is fluidically connected to the second introduction pipe, one port is fluidically connected to the bypass pipe, and one port is fluidically connected to the second distribution pipe.

The invention also proposes an aircraft having a first and a second dihydrogen tank, at least one engine and, for each engine, a supply system according to one of the above variants, wherein each of the first and second feed pipes is fluidically connected to one of the first and the second tank, and wherein the first and second distribution pipes are fluidically connected to the engine.

BRIEF DESCRIPTION OF THE DRAWINGS

The aforementioned features of the invention, and others, will become more clearly apparent on reading the following description of one exemplary embodiment, said description being given with reference to the appended drawings, in which.

DETAILED DESCRIPTION OF THE PREFERRED EMBODIMENTS

Figure 1:
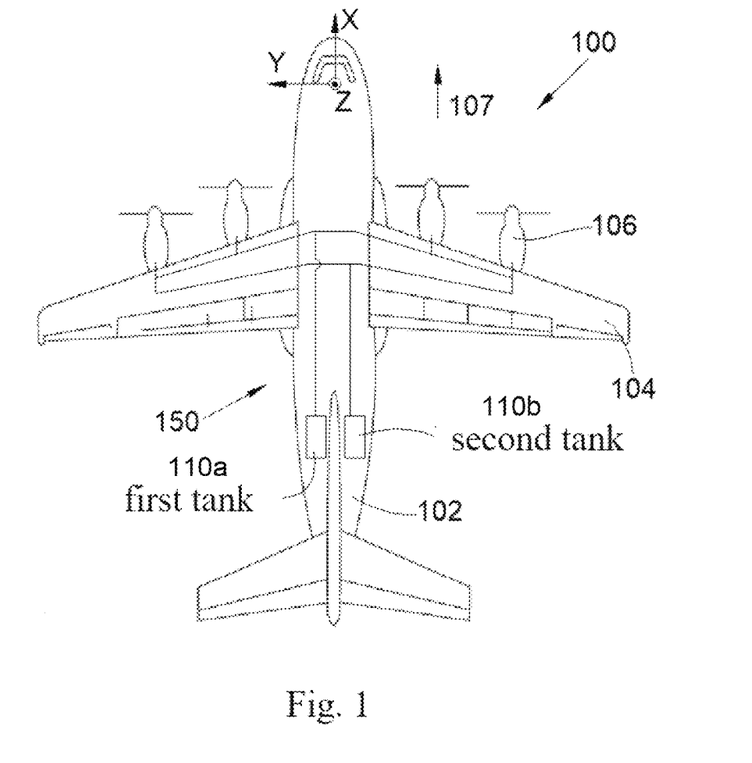
FIG. 1 is a top view of an aircraft according to the invention.

In the following description, terms relating to a position are considered in relation to an aircraft in a normal position of flight, that is to say as shown in FIG. 1.

In the following description, and by convention, the X direction is the longitudinal direction of the aircraft, the Y direction is the transverse direction which is horizontal when the aircraft is on the ground, and the Z direction is the vertical direction which is vertical when the aircraft is on the ground, these three directions X, Y and Z being mutually orthogonal.

FIG. 1 shows an aircraft 100 which has a fuselage 102 on each side, to which is secured a wing 104 which bears at least one engine 106 that functions with dihydrogen as fuel. In the embodiment of the invention shown in FIG. 1, the engine 106 is an engine with a propeller, but any other type of engine is conceivable.

The arrow 107 indicates the direction of forward travel of the aircraft 100.

The aircraft 100 has a first tank 110a and a second tank 110b in which the dihydrogen is stored in liquid form. In the embodiment of the invention, the two tanks 110a-b are disposed at the rear of the fuselage 102, but different positioning is possible.

The aircraft 100 also has a supply system 150 which provides the fluidic connection between the tanks 110a-b and each engine 106.

Figure 2:
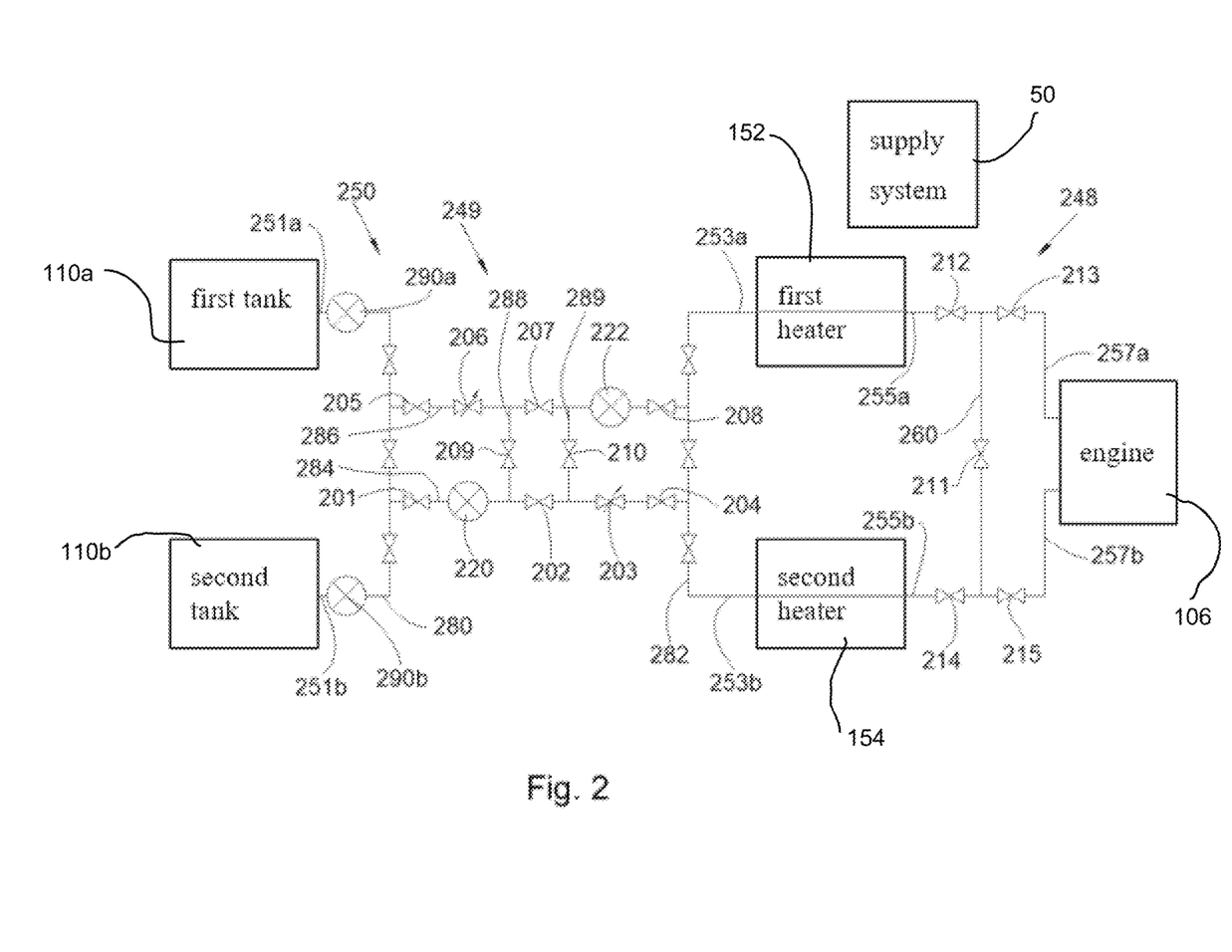
FIG. 2 is a schematic depiction of a supply system according to a first variant of a first embodiment of the invention.
Figure 3:
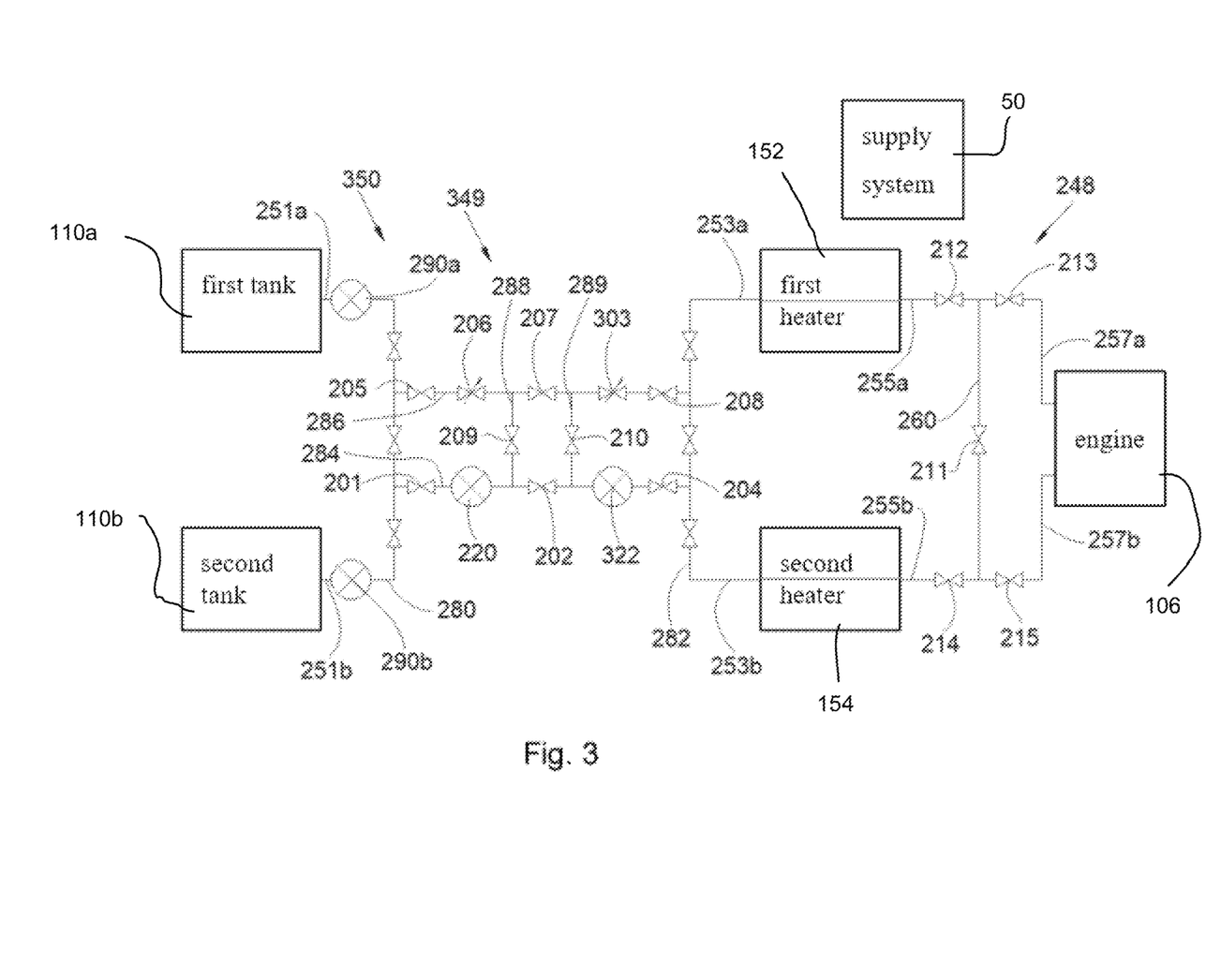
FIG. 3 is a schematic depiction of a supply system according to a second variant of the first embodiment.
Figure 4:
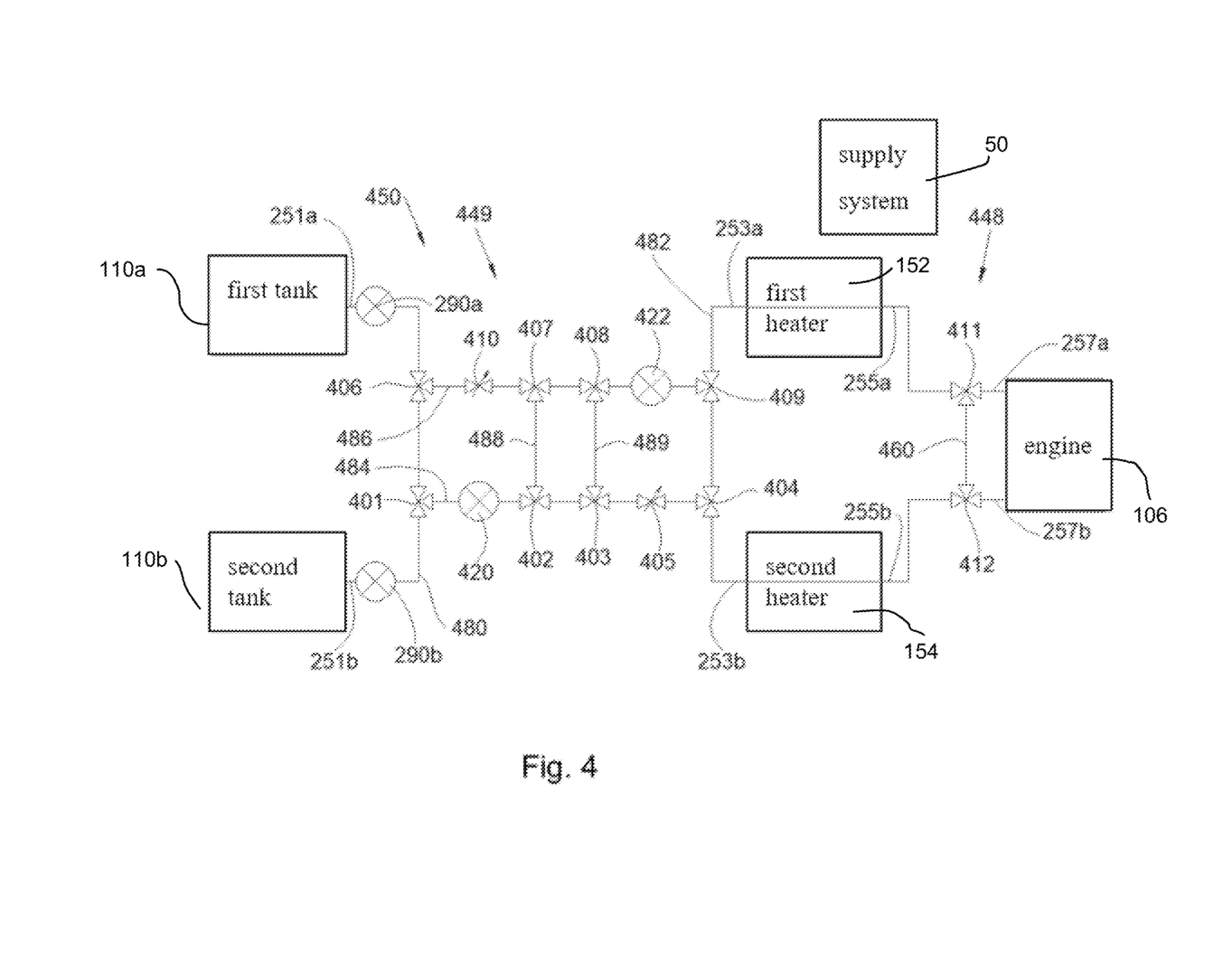
FIG. 4 is a schematic depiction of a supply system according to a first variant of a second embodiment of the invention.
Figure 5:
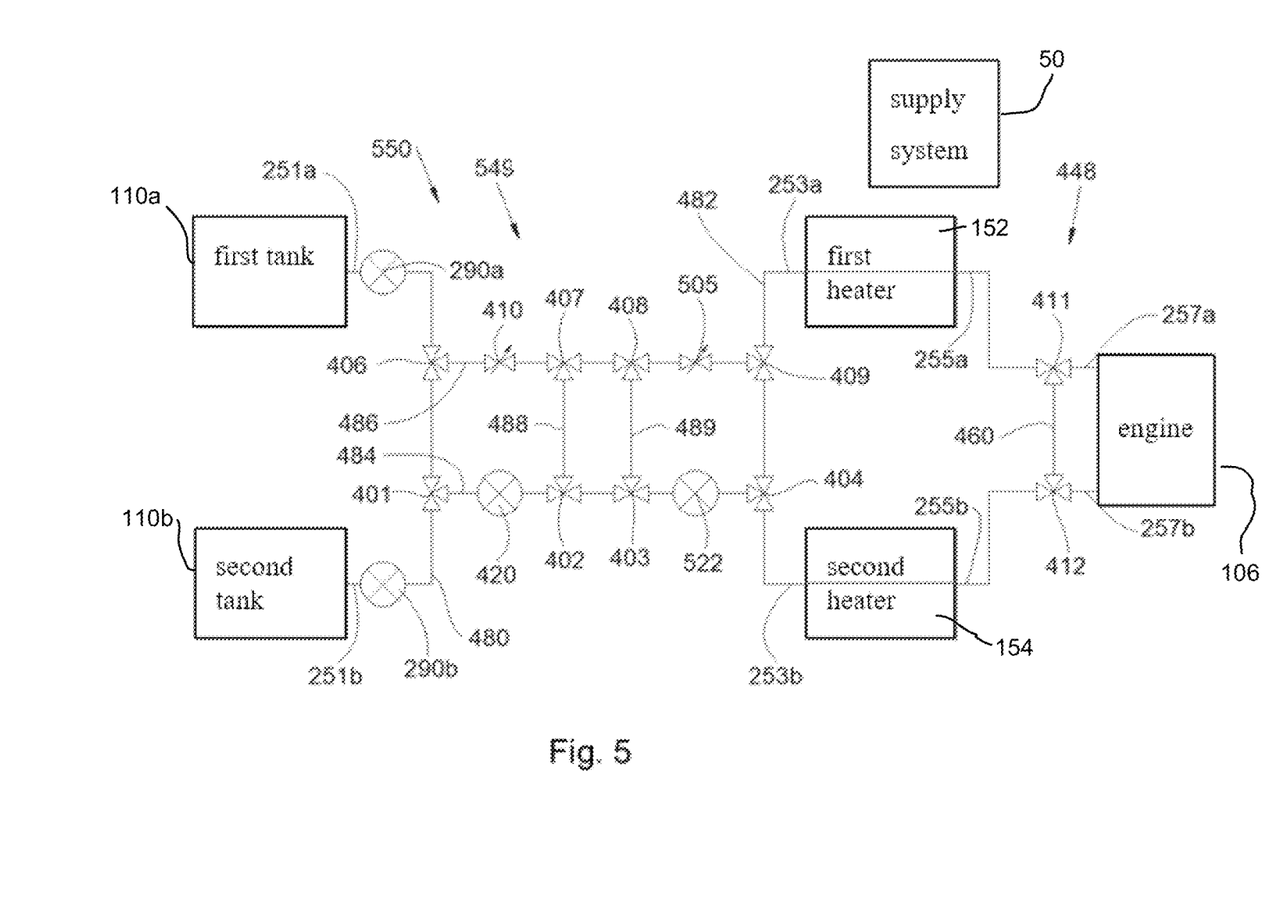
FIG. 5 is a schematic depiction of a supply system according to a second variant of the second embodiment of the invention.

FIG. 2 shows the supply system 250 according to a first variant of a first embodiment, FIG. 3 shows the supply system 350 according to a second variant of the first embodiment, FIG. 4 shows the supply system 450 according to a first variant of a second embodiment, and FIG. 5 shows the supply system 550 according to a second variant of the second embodiment.

The supply system 250, 350, 450, 550 is arranged between two tanks 110a-b and an engine 106 and there is then one such supply system 250, 350, 450, 550 for each engine 106.

In order to heat the dihydrogen and convert it to the gaseous phase, the supply system 250, 350, 450, 550 has a first heater 152 and a second heater 154 which are mounted in parallel. Such a heater 152, 154 is for example a heat exchanger which ensures an exchange of heat between a hot heat-transfer fluid and the cold dihydrogen, or a system with a heating resistor. Depending on the flight phases, it may be necessary for the dihydrogen to enter only one of the heaters 152 and 154, or for the dihydrogen to enter each heater 152, 154. Of course, the supply system 250 may have a single heater, or more than two heaters.

As explained below, the supply system 250, 350, 450, 550 has a normal operating mode and a degraded operating mode when one of the component elements thereof is not operational. During normal operation, recirculation loops return dihydrogen towards an inlet of the supply system 250, 350, 450, 550, and in the event of an incident, for example failure, each recirculation loop can be converted into a bypass loop which transports dihydrogen towards the engine 106, thereby avoiding the need to duplicate the dihydrogen transporting pipes.

The supply system 250, 350, 450, 550 has a supply module 249, 349, 449, 549 which is different for each embodiment variant and has means for taking up the liquid dihydrogen in the two tanks 110a-b and supplying it to the heaters 152 and 154 in parallel. These means can take the form of pipes, on which are arranged pumps and possibly solenoid valves, in order to take up the dihydrogen from the tanks 110a-b and supply it to the heaters 152 and 154. The supply system 250, 350, 450, 550 also has a distribution module 248, 448 which is different for each embodiment variant and has means for conveying the dihydrogen from the heaters 152 and 154 to the engine 106. These means can take the form of pipes on which solenoid valves are arranged, in order to convey the dihydrogen in circulation between the heaters 152 and 154 and the engine 106. The pipes in which the dihydrogen circulates can have a single wall or a double wall.

The distribution module 248, 348 is not associated with a particular embodiment and the distribution module 248 described with the first embodiment can be implemented with the second embodiment and vice versa, the distribution module 448 described with the second embodiment can be implemented with the first embodiment.

The supply module 249, 349, 449, 549 has a first feed pipe 251a fluidically connected to the first tank 110a and a second feed pipe 251b fluidically connected to the second tank 110b. The supply module 249, 349, 449, 549 also has a first outlet pipe 253a and a second outlet pipe 253b.

The supply module 249, 349, 449, 549 also has means for channeling the dihydrogen in the feed pipes 251a-b alternatively towards the first outlet pipe 253a or the second outlet pipe 253b or both. These means can take the form of pipes on which solenoid valves are arranged, in order to allow or prevent the circulation of the dihydrogen between the feed pipes 251a-b and the outlet pipes 253a-b.

The distribution module 248, 348 has, for the first heater 152, a first introduction pipe 255a fluidically connected to the first outlet pipe 253a via the first heater 152. The first outlet pipe 253a and the first introduction pipe 255a continue one another via the first heater 152. In the same way, the distribution module 248, 348 has, for the second heater 154, a second introduction pipe 255b fluidically connected to the second outlet pipe 253b via the second heater 154. The second outlet pipe 253b and the second introduction pipe 255b continue one another via the second heater 154.

The distribution module 248, 348 also has a first distribution pipe 257a and a second distribution pipe 257b, which are fluidically connected to the engine 106.

The distribution module 248, 348 also has means for channeling the dihydrogen in the introduction pipes 255a-b alternatively towards the first distribution pipe 257a or the second distribution pipe 257b or both. These means can take the form of pipes on which solenoid valves are arranged, in order to allow or prevent the circulation of the dihydrogen between the introduction pipes 255a-b and the distribution pipes 257a-b.

The supply system 250, 350, 450, 550 has detection means intended to detect an incident in the supply module 249, 349, 449, 549 and/or the distribution module 248, 348 and/or the heaters 152, 154, and a control unit 50 designed to command the means of the supply module 249, 349, 449, 549 and the means of the distribution module 248, 348 depending on information representative of the said incident that was detected, which information is provided by the detection means.

As explained below, the supply module 249, 349, 449, 549 and the distribution module 248, 348 are made up of pipes and solenoid valves. The said detection means are then, for example, intended to detect a leak of dihydrogen in each pipe of the supply module 249, 349, 449, 549 and the distribution module 248, 348, and each heater 152, 154, or to detect a malfunction of a heater 152, 154 or of a solenoid valve.

To detect a malfunction of a heater 152, 154 or of a solenoid valve, or of a pump, the detection means take, for example, the form of a monitoring system incorporated in the said heater 152, 154 or in the solenoid valve, or in the pump. For example, for a heater comprising a heat-transfer fluid circulating in the said heater, the monitoring system can comprise a pressure sensor configured to detect a variation (for example a drop) in pressure of the heat-transfer fluid circulating in the heater. According to another example, the monitoring system comprises a temperature sensor configured to detect a temperature of the hydrogen at the outlet of the heater and to send this temperature that was detected to a comparator, the comparator being configured to check that this temperature that was detected lies within a predetermined temperature range and to issue a warning if the temperature that was detected is outside the predetermined temperature range.

To detect a leak of dihydrogen in a pipe, it is possible to use double-walled pipes, in which the dihydrogen circulates in the inner wall and in which the detection means take, for example, the form of dihydrogen detectors or sensors disposed between the two walls in order to detect the presence of dihydrogen if there is a leak in the inner wall.

To detect a leak of dihydrogen in a heater 152, 154, it is possible to enclose each heater 152, 154 in a sealed casing, in which the detection means take, for example, the form of a dihydrogen detector arranged in the said casing.

In order to detect the presence of dihydrogen on the outside of the supply system 250, 350, that is to say not in a pump, a solenoid valve or a heater, a dihydrogen sensor may be installed.

Such an arrangement thus makes it possible to guide the dihydrogen from the tanks 110a-b towards the one or more outlet pipes 253a-b and then towards the one or more distribution pipes 257a as a function of the normal or degraded operating mode of the supply system 250, 350, 450, 550 without it being necessary to duplicate the supply system 250, 350, 450, 550.

The first feed pipe 251a is fitted with a first main pump 290a and the second feed pipe 251b is fitted with a second main pump 290b. The main pumps 290a-b are commanded by the control unit 50 and ensure the displacement of the dihydrogen in the feed pipe 25l a-b towards the supply module 249, 349, 449, 549.

In the first variant of the first embodiment, the supply module 249 has an upstream pipe 280 and a downstream pipe 282. The upstream pipe 280 is fluidically connected between the feed pipes 251a and 251b and the downstream pipe 282 is fluidically connected between the first outlet pipe 253a and the second outlet pipe 253b.

The supply module 249 also has a first linking pipe 284 and a second linking pipe 286. The first linking pipe 284 and the second linking pipe 286 are fluidically connected in parallel between the upstream pipe 280 and the downstream pipe 282.

The supply module 249 also has a first sub-pipe 288 and a second sub-pipe 289 that are fluidically connected in parallel between the first linking pipe 284 and the second linking pipe 286. The first sub-pipe 288 is between the upstream pipe 280 and the second sub-pipe 289, and consequently the second sub-pipe 289 is between the first sub-pipe 288 and the downstream pipe 282.

Between the upstream pipe 280 and the first sub-pipe 288, the supply module 249 has a two-way first solenoid valve 201, and a first secondary pump 220, which is commanded by the control unit 50 and ensures the displacement of the dihydrogen towards the engine 106, between the first solenoid valve 201 and the first sub-pipe 288, the first solenoid valve and the first secondary pump being mounted on the first linking pipe 284.

The supply module 249 has a two-way second solenoid valve 202 mounted on the first linking pipe 284 between the first sub-pipe 288 and the second sub-pipe 289.

The supply module 249 has a regulating two-way third solenoid valve 203 which is mounted on the first linking pipe 284 between the second sub-pipe 289 and the downstream pipe 282 and makes it possible to adjust the flow rate of dihydrogen in the first linking pipe 284 between the second sub-pipe 289 and the downstream pipe 282. The supply module 249 also has a two-way fourth solenoid valve 204 mounted on the first linking pipe 284 between the third solenoid valve 203 and the downstream pipe 282.

The supply module 249 has a two-way fifth solenoid valve 205 between the upstream pipe 280 and the first sub-pipe 288, and a regulating two-way sixth solenoid valve 206, which makes it possible to adjust the flow rate of dihydrogen in the second linking pipe 286 between the second sub-pipe 288 and the upstream pipe 280, between the fifth solenoid valve 205 and the first sub-pipe 288, the fifth solenoid valve and the sixth solenoid valve being mounted on the second linking pipe 286.

The supply module 249 has a two-way seventh solenoid valve 207 mounted on the second linking pipe 286 between the first sub-pipe 288 and the second sub-pipe 289.

The supply module 249 has a second secondary pump 222, which is mounted on the second linking pipe 286 between the second sub-pipe 289 and the downstream pipe 282, is commanded by the control unit 50, and ensures the displacement of the dihydrogen towards the engine 106. The supply module 249 also has a two-way eighth solenoid valve 208 mounted on the second linking pipe 286 between the second secondary pump 222 and the downstream pipe 282.

The supply module 249 has a two-way ninth solenoid valve 209 mounted on the first sub-pipe 288, and a two-way tenth solenoid valve 210 mounted on the second sub-pipe 289.

Each solenoid valve is made to open and close by the control unit 50 depending on requirements.

Each pump is commanded by the control unit 50 depending on requirements.

During normal operation, all the pumps are active and the solenoid valves of the supply module 249 are open. The dihydrogen is channeled from the tanks 110a-b and impelled by the pumps. The dihydrogen thus flows through the upstream pipe 280, the first solenoid valve 201 and the first secondary pump 220, then it arrives at the second secondary pump 222 and the eighth solenoid valve 208 so as to reach the outlet pipes 253a-b where it flows through the heaters 152 and 154, and then through the distribution module 248 and the engine 106. To get from the first linking pipe 284 to the second linking pipe 286, the dihydrogen passes through the second and tenth solenoid valves 202 and 210, or through the ninth and seventh solenoid valves 209 and 207.

At the same time, if required, dihydrogen is taken up at the fourth solenoid valve 204 so as to arrive at the second secondary pump 222 or the first secondary pump 220. The dihydrogen flows through the third solenoid valve 203, and then the sixth solenoid valve 206 and the fifth solenoid valve 205. To get from the second linking pipe 286 to the first linking pipe 284, the dihydrogen passes through the tenth and seventh solenoid valves 210 and 207, or through the second and ninth solenoid valves 202 and 209. At the tenth solenoid valve 210, the dihydrogen can arrive at the second secondary pump 222.

The amount of dihydrogen which will recirculate depends on the degree to which the third and sixth solenoid valves 203 and 206 are open.

In the event of an incident at the first secondary pump 220, the control unit 50 makes the first 201, second 202 and ninth 209 solenoid valves open in order to isolate the first secondary pump 220. The dihydrogen then passes through the second linking pipe 286 to arrive at the second secondary pump 222 and there is no longer recirculation through the sixth solenoid valve 206, although recirculation can continue through the third solenoid valve 203.

In the event of an incident at the second secondary pump 222, the control unit 50 makes the seventh 207, eighth 208 and tenth 210 solenoid valves close in order to isolate the second secondary pump 222. The dihydrogen then passes solely through the first linking pipe 284 to arrive at the outlet pipes 253a-b and there is no longer recirculation through the third solenoid valve 203, although recirculation can continue through the sixth solenoid valve 206.

In the event of an incident at the sixth solenoid valve 206, the control unit 50 makes the fifth 205, seventh 207 and ninth 209 solenoid valves close in order to isolate the sixth solenoid valve 206. The dihydrogen then takes the normal route but solely through the second 202 and tenth 210 solenoid valves between the first linking pipe 284 and the second linking pipe 286, and there is no longer recirculation through the sixth solenoid valve 206 although recirculation can continue through the third solenoid valve 203.

In the event of an incident at the third solenoid valve 203, the control unit 50 makes the second 202, fourth 204 and tenth 210 solenoid valves close in order to isolate the third solenoid valve 203. The dihydrogen then takes the normal route but solely through the ninth 209 and seventh 207 solenoid valves between the first linking pipe 284 and the second linking pipe 286, and there is no longer recirculation through the third solenoid valve 203 although recirculation can continue through the sixth solenoid valve 206.

In the event of a leak of dihydrogen in that part of the first linking pipe 284 that is between the first solenoid valve 201 and the second solenoid valve 202, the control unit 50 makes the first solenoid valve 201, the second solenoid valve 202 and the ninth solenoid valve 209 close.

The same principle applies for each part of the first linking pipe 284 and of the second linking pipe 286, wherein the control unit 50 makes the solenoid valves which are on either side of the leak and on the same linking pipe 284, 286 and the solenoid valve of the sub-pipe 288, 289 which is in fluidic communication with the said part close.

In the second variant of the first embodiment, the supply module 349 is identical to the supply module 249 of the first variant of the first embodiment, except that the second secondary pump 322 and the third solenoid valve 303 are interchanged. As a result, the second secondary pump 322 is mounted on the first linking pipe 284 between the second sub-pipe 289 and the fourth solenoid valve 204, and the third solenoid valve 303 is mounted on the second linking pipe 286 between the second sub-pipe 289 and the eighth solenoid valve 208.

The operation of the supply module 349 according to the second variant is similar to that of the supply module 249 according to the first variant, except that, during normal operation, the dihydrogen flows from the tanks 110a-b to the outlet pipes 253a-b passing solely through the first linking pipe 284, whereas the second linking pipe 286 serves for the recirculation of the dihydrogen.

As above, in the event of an incident at an element of the supply module 349, the control unit 50 makes the solenoid valves that ensure the isolation of the said element, that is to say the two solenoid valves which are on either side of the said element on the same linking pipe 284, 286 as the latter, and the solenoid valve that is between the said element and one of the said two solenoid valves and is on one of the sub-pipes 288, 289 close.

To isolate the main pumps 290a-b, for example to replace them during maintenance operations, the supply module 249, 349 has three solenoid valves that are mounted on the upstream pipe 280 and commanded by the control unit 50, wherein one solenoid valve is disposed between the first main pump 290a and the second linking pipe 286, one solenoid valve is disposed between the second linking pipe 286 and the first linking pipe 284, and one solenoid valve is disposed between the first linking pipe 284 and the second main pump 290b.

To isolate the heaters 152 and 154, for example to replace them during maintenance operations, the supply module 249, 349 has three solenoid valves that are mounted on the downstream pipe 282 and commanded by the control unit 50, wherein one solenoid valve is disposed between the first heater 152 and the second linking pipe 286, one solenoid valve is disposed between the second linking pipe 286 and the first linking pipe 284, and one solenoid valve is disposed between the first linking pipe 284 and the second heater 154.

In the first variant of the second embodiment, the supply module 449 has an upstream pipe 480 and a downstream pipe 482. The upstream pipe 480 is fluidically connected between the feed pipes 251*a* and 251*b* and the downstream pipe 482 is fluidically connected between the first outlet pipe 253*a* and the second outlet pipe 253*b*.

The supply module 449 also has a first linking pipe 484 and a second linking pipe 486. The first linking pipe 484 and the second linking pipe 486 are fluidically connected in parallel between the upstream pipe 480 and the downstream pipe 482.

The supply module 449 also has a first sub-pipe 488 and a second sub-pipe 489 that are fluidically connected in parallel between the first linking pipe 484 and the second linking pipe 486. The first sub-pipe 488 is between the upstream pipe 480 and the second sub-pipe 489, and consequently the second sub-pipe 489 is between the first sub-pipe 488 and the downstream pipe 482.

At the connection between the upstream pipe 480 and the first linking pipe 484, the supply module 449 has a three-way first solenoid valve 401, with two ports fluidically connected to the upstream pipe 480 and one port fluidically connected to the first linking pipe 484.

At the connection between the first linking pipe 484 and the first sub-pipe 488, the supply module 449 has a three-way second solenoid valve 402, with two ports fluidically connected to the first linking pipe 484 and one port fluidically connected to the first sub-pipe 488.

At the connection between the first linking pipe 484 and the second sub-pipe 489, the supply module 449 has a three-way third solenoid valve 403, with two ports fluidically connected to the first linking pipe 484 and one port fluidically connected to the second sub-pipe 489.

At the connection between the downstream pipe 482 and the first linking pipe 484, the supply module 449 has a three-way fourth solenoid valve 404, with two ports fluidically connected to the downstream pipe 482 and one port fluidically connected to the first linking pipe 484.

The supply module 449 has a first secondary pump 420, which is mounted on the first linking pipe 484 between the first solenoid valve 401 and the second solenoid valve 402 and ensures the displacement of the dihydrogen towards the engine 106.

The supply module 449 has a regulating two-way fifth solenoid valve 405 which is mounted on the first linking pipe 484 between the third solenoid valve 403 and the fourth solenoid valve 404 and makes it possible to adjust the flow rate of dihydrogen in the first linking pipe 484 between the second sub-pipe 489 and the downstream pipe 482.

At the connection between the upstream pipe 480 and the second linking pipe 486, the supply module 449 has a three-way sixth solenoid valve 406, with two ports fluidically connected to the upstream pipe 480 and one port fluidically connected to the second linking pipe 486.

At the connection between the second linking pipe 486 and the first sub-pipe 488, the supply module 449 has a three-way seventh solenoid valve 407, with two ports fluidically connected to the second linking pipe 486 and one port fluidically connected to the first sub-pipe 488.

At the connection between the second linking pipe 486 and the second sub-pipe 489, the supply module 449 has a three-way eighth solenoid valve 408, with two ports fluidically connected to the second linking pipe 486 and one port fluidically connected to the second sub-pipe 489.

At the connection between the downstream pipe 482 and the second linking pipe 486, the supply module 449 has a three-way ninth solenoid valve 409, with two ports fluidically connected to the downstream pipe 482 and one port fluidically connected to the second linking pipe 486.

The supply module 449 has a regulating two-way tenth solenoid valve 410 which is mounted on the second linking pipe 486 between the sixth solenoid valve 406 and the seventh solenoid valve 407 and makes it possible to adjust the flow rate of dihydrogen in the second linking pipe 486 between the first sub-pipe 488 and the upstream pipe 480.

The supply module 449 has a second secondary pump 422, which is mounted on the second linking pipe 486 between the eighth solenoid valve 408 and the ninth solenoid valve 409 and ensures the displacement of the dihydrogen towards the engine 106.

Each solenoid valve is made to open and close by the control unit 50 depending on requirements.

Each pump is commanded by the control unit 50 depending on requirements.

During normal operation, all the pumps are active and the solenoid valves of the supply module 449 are open. The dihydrogen is channeled from the tanks 110*a-b* and impelled by the pumps. The dihydrogen thus flows through the upstream pipe 480, the first solenoid valve 401 and the first secondary pump 420, then it arrives at the second secondary pump 422 and the ninth solenoid valve 409 so as to reach the outlet pipes 253*a-b* where it flows through the heaters 152 and 154, and then through the distribution module 448 and the engine 106. To get from the first linking pipe 484 to the second linking pipe 486, the dihydrogen passes through the second 402, third 403, seventh 407 and eighth 408 solenoid valves.

At the same time, if required, dihydrogen is taken up at the fourth solenoid valve 404 so as to arrive at the second secondary pump 422 or the first secondary pump 420. The dihydrogen flows through the fifth solenoid valve 405, and then the tenth solenoid valve 410 and the sixth solenoid valve 406. To get from the second linking pipe 486 to the first linking pipe 484, the dihydrogen passes through the second 402, third 403, seventh 407 and eighth 408 solenoid valves. At the eighth solenoid valve 408, the dihydrogen can arrive at the second secondary pump 422.

The amount of dihydrogen which will recirculate depends on the degree to which the fifth 405 and tenth 410 solenoid valves are open.

In the event of an incident at the first secondary pump 420, the control unit 50 makes that port of the first solenoid valve 401 and that port of the second solenoid valve 402 that are fluidically connected to the first linking pipe 484 close in order to isolate the first secondary pump 420. The dihydrogen then passes through the second linking pipe 486 to arrive at the second secondary pump 422 and there is no longer recirculation through the tenth solenoid valve 410, although recirculation can continue through the fifth solenoid valve 405.

In the event of an incident at the second secondary pump 422, the control unit 50 makes that port of the eighth solenoid valve 408 and that port of the ninth solenoid valve 409 that are fluidically connected to the second linking pipe 486 close in order to isolate the second secondary pump 422. The dihydrogen then passes solely through the first linking pipe 484 to arrive at the outlet pipes 253*a-b* and there is no longer recirculation through the fifth solenoid valve 405, although recirculation can continue through the tenth solenoid valve 410.

In the event of an incident at the tenth solenoid valve 410, the control unit 50 makes that port of the sixth solenoid valve 406 and that port of the seventh solenoid valve that are fluidically connected to the second linking pipe 486 close in order to isolate the tenth solenoid valve 410. The dihydrogen then takes the normal route but there is no longer recirculation through the tenth solenoid valve 410, although recirculation can continue through the fifth solenoid valve 405.

In the event of an incident at the fifth solenoid valve 405, the control unit 50 makes that port of the third solenoid valve 403 and that port of the fourth solenoid valve 404 that are fluidically connected to the second linking pipe 486 close in order to isolate the fifth solenoid valve 405. The dihydrogen then takes the normal route but there is no longer recirculation through the fifth solenoid valve 405, although recirculation can continue through the tenth solenoid valve 410.

In the second variant of the second embodiment, the supply module 549 is identical to the supply module 449 of the first variant of the second embodiment, except that the second secondary pump 522 and the fifth solenoid valve 505 are interchanged. As a result, the second secondary pump 522 is mounted on the first linking pipe 484 between the third solenoid valve 403 and the fourth solenoid valve 404, and the fifth solenoid valve 505 is mounted on the second linking pipe 486 between the eighth solenoid valve 408 and the ninth solenoid valve 409.

The operation of the supply module 549 according to the second variant is similar to that of the supply module 449 according to the first variant, except that, during normal operation, the dihydrogen flows from the tanks 110*a-b* to the outlet pipes 253*a-b* passing solely through the first linking pipe 484, whereas the second linking pipe 486 serves for the recirculation of the dihydrogen.

As above, in the event of an incident at an element of the supply module 549, the control unit 50 makes those ports of the solenoid valves that ensure the isolation of the said element, that is to say the two ports that are on either side of the said element on the same linking pipe 484, 486 as the latter, close.

In the event of a leak of dihydrogen in that part of the first linking pipe 484 that is between the first solenoid valve 401 and the second solenoid valve 402, the control unit 50 makes the port of the first solenoid valve 401 and the port of the second solenoid valve 402 close.

The same principle applies for each part of the first linking pipe 484 and of the second linking pipe 486, wherein the control unit 50 makes those ports of the solenoid valves that are on either side of the leak and on the same linking pipe 484, 486 close.

FIG. 2 and FIG. 3 show the distribution module 248 according to a first variant, and FIG. 4 and FIG. 5 show the distribution module 448 according to a second variant. Although the distribution module 248 according to the first variant is associated with the supply system 250, 350 according to the first embodiment and the distribution module 448 according to the second variant is associated with the supply system 450, 550 according to the second embodiment, it is possible to use the distribution module 248 according to the first variant with the supply system 450, 550 according to the second embodiment and the distribution module 448 according to the second variant with the supply system 250, 350 according to the first embodiment.

According to the first variant of the distribution module 248, the first introduction pipe 255*a* is fluidically connected to the first distribution pipe 257*a*, and the second introduction pipe 255*b* is fluidically connected to the second distribution pipe 257*b*.

The distribution module 248 has a bypass pipe 260 fluidically connected between the first introduction pipe 255*a* and the second introduction pipe 255*b*, and a two-way eleventh solenoid valve 211 mounted on the bypass pipe 260.

The distribution module 248 also has a two-way twelfth solenoid valve 212 mounted on the first introduction pipe 255*a* between the first heater 152 and the bypass pipe 260, and a thirteenth solenoid valve 213 mounted on the first distribution pipe 257*a* between the bypass pipe 260 and the engine 106.

The distribution module 248 also has a two-way fourteenth solenoid valve 214 mounted on the second introduction pipe 255*b* between the second heater 154 and the bypass pipe 260, and a fifteenth solenoid valve 215 mounted on the second distribution pipe 257*b* between the bypass pipe 260 and the engine 106.

Each solenoid valve is made to open and close by the control unit 50.

Such a system makes it possible to direct the dihydrogen towards the engine 106, whether it comes from the first heater 152 or the second heater 154.

If a leak appears between the first heater 152 and the twelfth solenoid valve 212, the control unit 50 makes the twelfth solenoid valve 212 close and the dihydrogen circulates solely through the second introduction pipe 255*b* and then the first distribution pipe 257*a* and/or the second distribution pipe 257*b*.

The principle is the same for the other pipes of the distribution module 248 that can be isolated in the event of a leak.

According to the second variant of the distribution module 448, the first introduction pipe 255*a* is fluidically connected to the first distribution pipe 257*a*, and the second introduction pipe 255*b* is fluidically connected to the second distribution pipe 257*b*.

The distribution module 448 has a bypass pipe 460 fluidically connected between the first introduction pipe 255*a* and the second introduction pipe 255*b*.

At the connection between the first introduction pipe 255*a* and the bypass pipe 460, the distribution module 448 has a three-way eleventh solenoid valve 411, wherein one port is fluidically connected to the first introduction pipe 255*a*, one port is fluidically connected to the bypass pipe 460, and one port is fluidically connected to the first distribution pipe 257*a*.

At the connection between the second introduction pipe 255*b* and the bypass pipe 460, the distribution module 448 has a three-way twelfth solenoid valve 412, wherein one port is fluidically connected to the second introduction pipe 255*b*, one port is fluidically connected to the bypass pipe 460, and one port is fluidically connected to the second distribution pipe 257*b*.

Each solenoid valve is made to open and close by the control unit 50.

Such a system makes it possible to direct the dihydrogen towards the engine 106 whether it comes from the first heater 152 or the second heater 154.

If a leak appears between the first heater 152 and the eleventh solenoid valve 411, the control unit 50 makes that port of the eleventh solenoid valve 411 that is fluidically connected to the first introduction pipe 255*a* close and the dihydrogen circulates solely through the second introduction pipe 255*b* and then the first distribution pipe 257*a* and/or the second distribution pipe 257*b*.

The principle is the same for the other pipes of the distribution module 448 that can be isolated in the event of a leak.

According to one embodiment, the control unit 50 has the following, connected by a communication bus: a processor or CPU ("central processing unit"); a random access memory (RAM); a read-only memory (ROM); a storage unit such as a hard disk drive or a storage medium reader, such as a SD ("secure digital") card reader; and at least one communication interface which allows, for example, the control unit to communicate with the solenoid valves, the pumps, etc.

The processor is capable of executing instructions loaded into the RAM from the ROM, from an external memory (not shown), from a storage medium (such as an SD card), or from a communication network. When the apparatus is turned on, the processor is capable of reading instructions from the RAM and executing them. These instructions form a computer program that causes the processor to implement all or some of the algorithms and steps that were described.

All or some of the algorithms and steps described below may be implemented in software form by executing a set of instructions using a programmable machine, for example a DSP ("digital signal processor") or a microcontroller, or be implemented in hardware form by a machine or a dedicated component, for example an FPGA ("field-programmable gate array") or an ASIC ("application-specific integrated circuit").

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A supply system for an aircraft, having a first dihydrogen tank, a second dihydrogen tank and an engine, the supply system comprising:
a supply module comprising a first outlet pipe, a second outlet pipe, a first feed pipe fitted with a first main pump and configured to be fluidically connected to the first dihydrogen tank, a second feed pipe fitted with a second main pump and configured to be fluidically connected to the second dihydrogen tank, and channeling means designed to channel the dihydrogen in the first feed pipe and second feed pipes alternatively towards the first outlet pipe, or the second outlet pipe or both,
an upstream pipe fluidically connected between the first feed pipe and second feed pipe,
a downstream pipe fluidically connected between the first outlet pipe and the second outlet pipe,
a first linking pipe that is fluidically connected between the upstream pipe and the downstream pipe, a second linking pipe that is fluidically connected between the upstream pipe and the downstream pipe, the first linking pipe and the second linking pipe being arranged fluidically connected in parallel one to the other,
a first sub-pipe that is fluidically connected between the first linking pipe and the second linking pipe, a second sub-pipe that is fluidically connected between the first linking pipe and the second linking pipe, the first sub-pipe and the second sub-pipe being arranged fluidically connected in parallel one to the other,
a first heater,
a second heater,
a distribution module comprising a first introduction pipe fluidically connected to the first outlet pipe via the first heater, a second introduction pipe fluidically connected to the second outlet pipe via the second heater, a first distribution pipe and a second distribution pipe that are configured to be fluidically connected to the engine, and channeling means for channeling the dihydrogen in the first introduction pipe and second introduction pipes alternatively towards the first distribution pipe or the second distribution pipe or both,
detection means configured to detect an incident in the supply module, the distribution module, the first heater and second heaters, or any combination thereof, and to provide information representative of the incident that was detected, and
a control unit configured to command the channeling means of the supply module, the channeling means of the distribution module, or both depending on the information provided by the detection means,
wherein the supply module further comprises:
a two-way first solenoid valve mounted on the first linking pipe between the upstream pipe and the first sub-pipe,
a first secondary pump mounted on the first linking pipe between the first solenoid valve and the first sub-pipe,
a two-way second solenoid valve mounted on the first linking pipe between the first sub-pipe and the second sub-pipe,
a regulating two-way third solenoid valve mounted on the first linking pipe between the second sub-pipe and the downstream pipe,
a two-way fourth solenoid valve mounted on the first linking pipe between the third solenoid valve and the downstream pipe,
a two-way fifth solenoid valve mounted on the second linking pipe between the upstream pipe and the first sub-pipe,
a regulating two-way sixth solenoid valve mounted on the second linking pipe between the fifth solenoid valve and the first sub-pipe,
a two-way seventh solenoid valve mounted on the second linking pipe between the first sub-pipe and the second sub-pipe,
a second secondary pump mounted on the second linking pipe between the second sub-pipe and the downstream pipe,
a two-way eighth solenoid valve mounted on the second linking pipe between the second secondary pump and the downstream pipe,
a two-way ninth solenoid valve mounted on the first sub-pipe, and
a two-way tenth solenoid valve mounted on the second sub-pipe.

2. The supply system according to claim 1, wherein the first introduction pipe is fluidically connected to the first distribution pipe, the second introduction pipe is fluidically connected to the second distribution pipe, and wherein the distribution module further comprises:

a bypass pipe fluidically connected between the first introduction pipe and the second introduction pipe, a two-way eleventh solenoid valve mounted on the bypass pipe, between the first heater and the bypass pipe, a two-way twelfth solenoid valve mounted on the first introduction pipe, between the bypass pipe and the engine, a thirteenth solenoid valve mounted on the first distribution pipe, between the second heater and the bypass pipe, a two-way fourteenth solenoid valve mounted on the second introduction pipe, and between the bypass pipe and the engine, a fifteenth solenoid valve mounted on the second distribution pipe.

3. An aircraft comprising:

a first dihydrogen tank, a second dihydrogen tank, at least one engine and, for each engine, the supply system according to claim 1, wherein each of the first feed pipe and second feed pipes is fluidically connected to one of the first dihydrogen tank and the second dihydrogen tank, and wherein the first distribution pipe and second distribution pipes are fluidically connected to the at least one engine.

* * * * *